United States Patent
Ohno et al.

(10) Patent No.: US 10,308,207 B2
(45) Date of Patent: Jun. 4, 2019

(54) VEHICLE AIRBAG DEVICE

(71) Applicant: Toyota Jidosha Kabushiki Kaisha, Toyota-shi, Aichi-ken (JP)

(72) Inventors: Mitsuyoshi Ohno, Miyoshi (JP); Shinichi Ishida, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 213 days.

(21) Appl. No.: 15/196,861

(22) Filed: Jun. 29, 2016

(65) Prior Publication Data

US 2017/0015270 A1    Jan. 19, 2017

(30) Foreign Application Priority Data

Jul. 17, 2015   (JP) ................................. 2015-142950

(51) Int. Cl.
| | |
|---|---|
| *B60R 21/231* | (2011.01) |
| *B60R 21/233* | (2006.01) |
| *B60R 21/205* | (2011.01) |
| *B60R 21/237* | (2006.01) |

(52) U.S. Cl.
CPC .......... *B60R 21/233* (2013.01); *B60R 21/205* (2013.01); *B60R 21/231* (2013.01); *B60R 21/237* (2013.01); *B60R 21/23138* (2013.01); *B60R 2021/23308* (2013.01); *B60R 2021/23324* (2013.01)

(58) Field of Classification Search
CPC ........ B60R 21/203; B60R 2021/23324; B60R 2021/23308; B60R 21/237; B60R 21/205; B60R 21/231; B60R 21/23138
See application file for complete search history.

(56) References Cited

U.S. PATENT DOCUMENTS

| 10,067,726 | B2 * | 9/2018 | Wakamoto | ............ | G06F 3/1423 |
| 2003/0034638 | A1 * | 2/2003 | Yoshida | ................ | B60R 21/233 280/729 |
| 2003/0094794 | A1 * | 5/2003 | Amamori | ............... | B60R 21/231 280/729 |
| 2008/0048420 | A1 * | 2/2008 | Washino | ............... | B60R 21/203 280/731 |
| 2012/0193896 | A1 * | 8/2012 | Turnbull | ............... | B60R 21/233 280/729 |

(Continued)

FOREIGN PATENT DOCUMENTS

| JP | 06-024282 A | 2/1994 |
| JP | 06-072276 A | 3/1994 |

(Continued)

*Primary Examiner* — Karen Beck
(74) *Attorney, Agent, or Firm* — Dinsmore & Shohl LLP

(57) ABSTRACT

A vehicle airbag device of the present disclosure includes an airbag provided inside a front passenger seat side of an instrument panel. The airbag includes: a first bag inflated and deployed from the instrument panel toward the front passenger seat side; and a second bag inflated and deployed at a vehicle width direction center side of the first bag. The second bag is disposed, in side view, at a vehicle rear side of a vehicle cabin interior component, and is disposed, in side view, obliquely at a vehicle lower side and rear side of an inner mirror. The second bag is inflated and deployed from the first bag toward the vehicle width direction center side on being supplied with gas from the first bag that has been inflated and deployed.

9 Claims, 4 Drawing Sheets

(56) References Cited

U.S. PATENT DOCUMENTS

| | | | |
|---|---|---|---|
| 2015/0074969 A1* | 3/2015 | Jindal | B60R 21/205 |
| | | | 29/428 |
| 2015/0166002 A1 | 6/2015 | Fukawatase | |
| 2015/0367802 A1 | 12/2015 | Fukawatase et al. | |
| 2016/0009242 A1* | 1/2016 | Fukawatase | B60R 21/2338 |
| | | | 280/730.1 |
| 2016/0039385 A1* | 2/2016 | Watamori | B60R 21/23138 |
| | | | 280/730.1 |
| 2016/0046257 A1* | 2/2016 | Yamada | B60R 21/2338 |
| | | | 280/729 |
| 2017/0174171 A1* | 6/2017 | Dennis | B60R 21/0136 |
| 2017/0217397 A1* | 8/2017 | Sumiya | B60R 21/233 |
| 2018/0015902 A1* | 1/2018 | Maenishi | B60R 21/205 |

FOREIGN PATENT DOCUMENTS

| | | | | |
|---|---|---|---|---|
| JP | H08268204 A | | 10/1996 | |
| JP | H08324373 A | | 12/1996 | |
| JP | H10175498 A | | 6/1998 | |
| JP | 2003-312420 A | | 11/2003 | |
| JP | 2012-056371 A | | 3/2012 | |
| JP | 2015-113027 A | | 6/2015 | |
| JP | 2016-007892 A | | 1/2016 | |
| JP | 2016-016716 A | | 2/2016 | |
| JP | 2016016716 A | * | 2/2016 | B60R 21/231 |
| JP | 2017065456 A | * | 4/2017 | |
| JP | 2017100685 A | * | 6/2017 | B60R 21/01332 |
| JP | 6197756 B2 | * | 9/2017 | |
| JP | 2018094932 A | * | 6/2018 | B60R 21/231 |

* cited by examiner

VEHICLE AIRBAG DEVICE

CROSS-REFERENCE TO RELATED APPLICATION

This application claims priority under 35 USC 119 from Japanese Patent Application No. 2015-142950 filed Jul. 17, 2015, the disclosure of which is incorporated by reference herein.

BACKGROUND

Technical Field

The present disclosure relates to a vehicle airbag device.

Related Art

In a vehicle airbag device described in Japanese Patent Application Laid-Open (JP-A) No. 2012-056371, an airbag includes a pair of inflation sections, and a pair of extension portions extend toward the vehicle rear side from locations of the pair of inflation sections at heights corresponding to the head and shoulders of the occupant. This enables a front passenger seat occupant to be restrained from moving obliquely toward the front side in an oblique collision of the vehicle. Note that vehicle airbag devices are also described in JP-A Nos. H06-072276 and H06-024282.

It would be conceivable to provide the airbag with a second bag extending in the vehicle front-rear direction at the vehicle width direction center side of the airbag, in order to improve restraint performance of an occupant moving obliquely forward toward the vehicle width direction center side in an oblique collision of the vehicle.

However, when an airbag configured in this manner is inflated and deployed, the second bag is inflated and deployed together with the airbag toward the vehicle rear side from an instrument panel. There is accordingly a possibility that the second bag that is inflated and deployed toward the vehicle rear side impinges (catches) on a vehicle cabin interior component such as a display provided to the instrument panel, or on an inner mirror (rear-view mirror) or the like provided to a windshield, for example. In such cases, there is an issue that the deployment performance of the airbag is reduced.

SUMMARY

In consideration of the above circumstances, the present disclosure provides a vehicle airbag device capable of improving the deployment performance of an airbag including a second bag.

A vehicle airbag device of a first aspect of the present disclosure includes an airbag that is provided inside a front passenger seat side of an instrument panel and that is inflated and deployed toward an outer side of the front passenger seat side of the instrument panel on being supplied with gas from an inflator, the airbag including: a first bag that is inflated and deployed from the instrument panel toward the front passenger seat side and that is disposed at a vehicle front side of a front passenger seat occupant; and a second bag that is inflated and deployed at a vehicle width direction center side of the first bag, and that is disposed, in side view, at a vehicle rear side of a vehicle cabin interior component installed at a vehicle width direction center portion of the instrument panel and is disposed, in side view, obliquely at a vehicle lower side and rear side of an inner mirror installed at a vehicle width direction center portion of a roof or a windshield, a rear end portion of the second bag projecting out further toward the vehicle rear side than the first bag and disposed obliquely at a vehicle width direction center side and front side of a head of the front passenger seat occupant, wherein, the second bag is inflated and deployed from the first bag toward the vehicle width direction center side on being supplied with gas from the first bag that has been inflated and deployed.

In the vehicle airbag device with the above configuration, the airbag is provided inside the front passenger seat side of the instrument panel, and the airbag is inflated and deployed toward the outer side of the front passenger seat side of the instrument panel on being supplied with gas from the inflator. Specifically, the first bag is inflated and deployed from the instrument panel toward the vehicle rear side, and is disposed at the vehicle front side of the front passenger seat occupant. The second bag is inflated and deployed at the vehicle width direction center side of the first bag, the rear end portion of the second bag projects out further toward the vehicle rear side than the first bag, and is disposed obliquely at the vehicle width direction center side and front side of the head of the front passenger seat occupant. In an oblique collision of the vehicle, for example, the head of the front passenger seat occupant attempting to move obliquely forward toward the vehicle width direction center side is thereby restrained by the second bag. This enables restraint performance of the occupant to be improved.

In the inflated and deployed state of the second bag, the second bag is disposed, in side view, at the vehicle rear side of the vehicle cabin interior component installed at the vehicle width direction center portion of the instrument panel and is disposed, in side view, obliquely at the vehicle lower side and rear side of the inner mirror installed at the vehicle width direction center portion of the roof or the windshield. The second bag is thereby disposed at the vehicle rear side of the vehicle cabin interior component with respect to the vehicle front-rear position of the vehicle cabin interior component, and is disposed at the vehicle rear side of the inner mirror with respect to the vehicle front-rear position of the inner mirror.

Note that the second bag is inflated and deployed toward the vehicle width direction center side on being supplied with gas from the first bag that has been inflated and deployed. The second bag is thereby inflated and deployed later than inflation and deployment of the first bag, and is inflated and deployed toward the vehicle width direction center side, which is different to the inflation and deployment direction of the first bag. This enables the second bag to be inflated and deployed at the vehicle rear side of both the inner mirror and the vehicle cabin interior component, without being inflated and deployed from the vehicle front side toward the vehicle rear side of the inner mirror and the vehicle cabin interior component. This enables the second bag to be suppressed from catching (impinging) on the vehicle cabin interior component and the inner mirror during inflation and deployment of the second bag. The deployment performance of the airbag including the second bag is thereby improved.

A vehicle airbag device of a second aspect of the present disclosure is the first aspect, wherein the first bag includes a partition wall that partitions between the first bag and the second bag; the partition wall is formed with a flow path that places interiors of the first bag and the second bag in communication with each other in a vehicle width direction; and gas is supplied to the second bag through the flow path from the first bag that has been inflated and deployed.

In the vehicle airbag device with the above configuration, the flow path formed to the partition wall is opened by inflation and deployment of the first bag, and gas is supplied to the second bag through the flow path. This enables the second bag to be made to start inflation and deployment after inflation and deployment of the first bag, using a simple configuration.

A vehicle airbag device of a third aspect of the present disclosure is the second aspect, wherein in a state in which the airbag has been inflated and deployed, the flow path is disposed further toward the vehicle rear side than the inner mirror.

In the vehicle airbag device with the above configuration, the flow path that is a gas supply portion to the second bag is disposed at the vehicle rear side of the inner mirror and the vehicle cabin interior component, thereby enabling inflation and deployment of the second bag to be started at the vehicle rear side of the inner mirror and the vehicle cabin interior component. This enables the second bag to be effectively suppressed from catching (impinging) on the vehicle cabin interior component and the inner mirror during inflation and deployment of the second bag.

A vehicle airbag device of a fourth aspect of the present disclosure is the second aspect, wherein the partition wall is formed with plural flow paths arranged along a vehicle up-down direction, and opening areas of the plural flow paths are different areas.

In the vehicle airbag device with the above configuration, appropriately setting the opening areas of the plural flow paths to different areas corresponding to the shape of the second bag, for example, enables inflation and deployment of the second bag to be well balanced.

A vehicle airbag device of a fifth aspect of the present disclosure is the first aspect, wherein the airbag is stowed in a folded state in a case provided inside the instrument panel; and in the folded-state of the airbag, after the second bag has been folded toward a side of the first bag, the first bag and the second bag are folded in a vehicle front-rear direction.

In the vehicle airbag device with the above configuration, the airbag is inflated and deployed in reverse sequence to the folding sequence of the airbag when the airbag is inflated and deployed, such that the second bag is inflated and deployed after inflation and deployment of the first bag. This enables the inflation and deployment timing of the second bag to be made later than the inflation and deployment timing of the first bag by the folding method of the airbag as well.

BRIEF DESCRIPTION OF THE DRAWINGS

Exemplary embodiments of the present disclosure will be described in detail based on the following figures, wherein.

DETAILED DESCRIPTION

Explanation follows regarding a vehicle airbag device 30 according to an exemplary embodiment, with reference to the drawings. Note that in each of the drawings as appropriate, the arrow FR, the arrow UP, and the arrow RH respectively refer to the vehicle front side, the vehicle upper side, and the vehicle right side of an automobile (vehicle) V applied with the vehicle airbag device 30. In the below explanation, unless specifically stated otherwise, simple reference to the front-rear, up-down, and left-right directions refers to front and rear in the vehicle front-rear direction, up and down in the vehicle up-down direction, and the left and right of the vehicle (when facing the front).

(Outline Configuration of Automobile V Interior)

Figure 2:
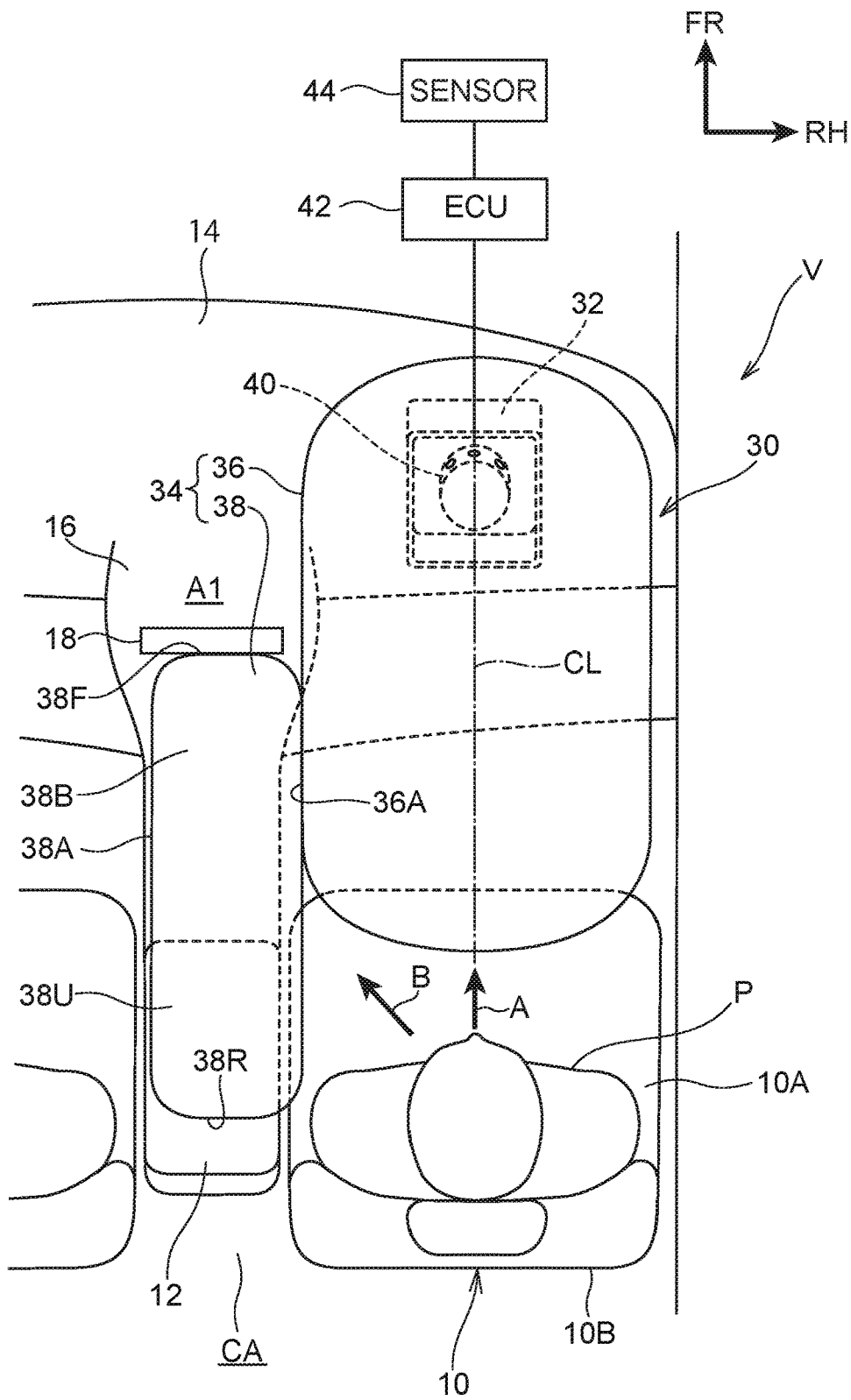
FIG. 2 is a plan view illustrating an inflated and deployed state of the airbag of the vehicle airbag device illustrated in FIG. 1.

FIG. 2 is a plan view schematically illustrating a right side section of a front section inside a cabin CA of the automobile V applied with the vehicle airbag device 30. Note that in FIG. 2, an airbag 34 of the vehicle airbag device 30, described later, is illustrated in an inflated and deployed state. As illustrated in FIG. 2, a vehicle seat 10 employed as a front passenger seat (hereafter referred to as front passenger seat 10) is installed at the right side section of the front section of the cabin CA. The front passenger seat 10 is configured including a seat cushion 10A on which an occupant P (hereafter referred to as "front passenger seat passenger P") sits, and a seatback 10B that supports the back of the front passenger seat passenger P, and a lower end portion of the seatback 10B is coupled to a rear end portion of the seat cushion 10A.

An occupant restraint seatbelt device (not illustrated in the drawings) is provided to the front passenger seat 10, and the seatbelt device is what is referred to as a three-point seatbelt device. Thus the lumbar region of the front passenger seat passenger P is restrained by a lap belt, and the upper body of the front passenger seat passenger P is restrained by a shoulder belt.

A vehicle seat employed as a driver seat, not illustrated in the drawings, is installed at the left side of the front passenger seat 10. A center console 12 is installed at a vehicle width direction center section of the automobile V (specifically, between the vehicle seat employed as a driver seat and the front passenger seat 10 employed as a front passenger seat). Namely, in the automobile V of the present exemplary embodiment, configuration is such that there is no center seat disposed between the vehicle seat employed as a driver seat and the front passenger seat 10 employed as a front passenger seat. Note that the automobile V may have a configuration that does not include the center console 12 (a configuration may be applied, for example, in which there is an aisle between left and right vehicle seats).

An instrument panel 14 is provided extending along the vehicle width direction at the front side of the front passenger seat 10, and a center panel 16 is provided at a vehicle width direction center portion of the instrument panel 14. A display 18 (display device), serving as a "vehicle cabin interior component", is installed at the center panel 16. The display 18 is formed in a flat, substantially rectangular shape, projects out toward the upper side from the center panel 16, and is disposed with a display face at the rear side.

Figure 1:
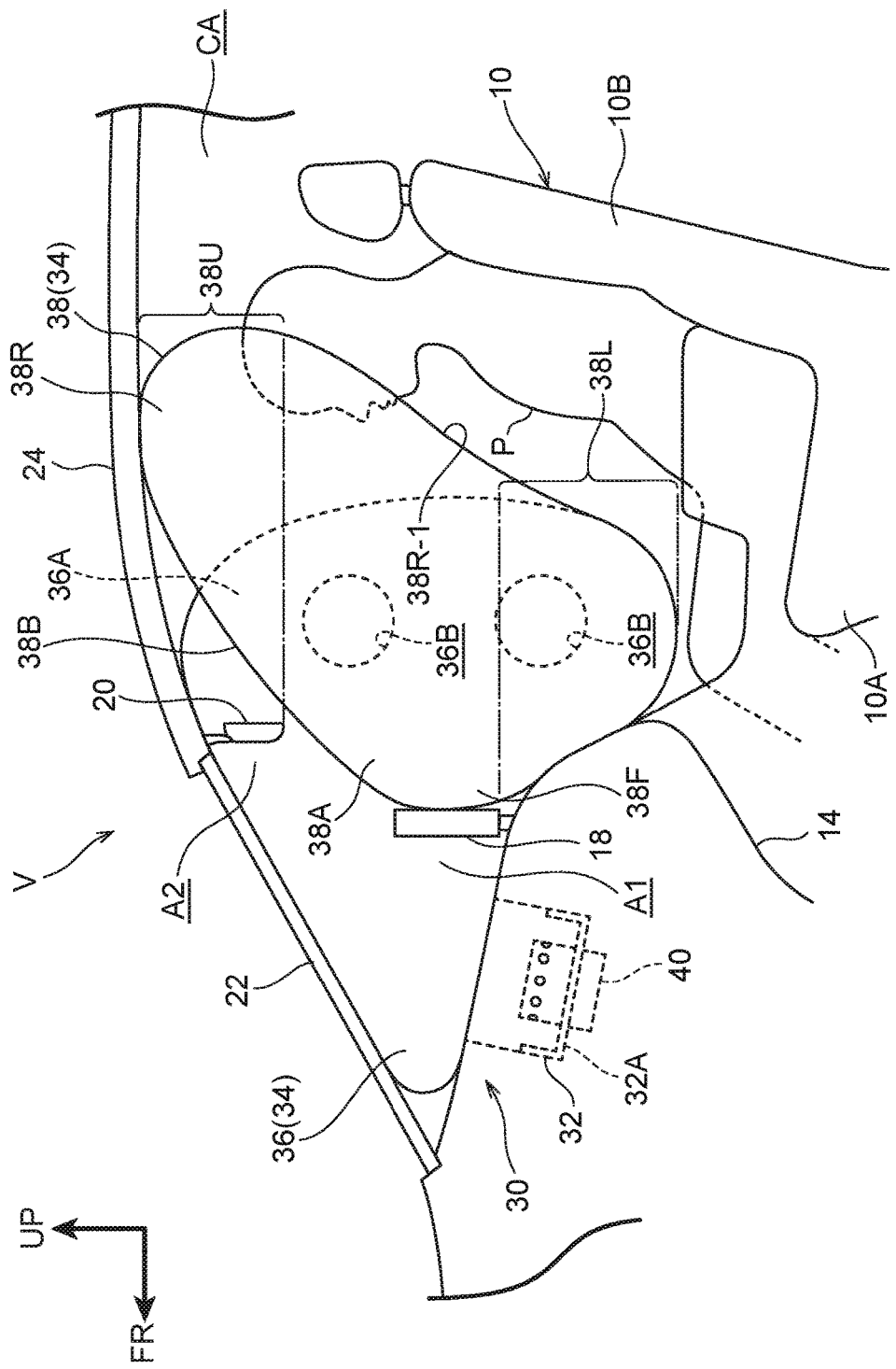
FIG. 1 is a side view viewed from a driving seat side, illustrating a state in which an airbag of a vehicle airbag device according to an exemplary embodiment has been inflated and deployed.

As illustrated in FIG. 1, an inner mirror 20 is provided in front of the front passenger seat 10, at an upper portion inside the cabin CA. Specifically, the inner mirror 20 is disposed at the rear side and upper side of the display 18.

The inner mirror 20 is disposed at an upper portion of a windshield (front glass) 22, or at a vehicle width direction center portion of a front end portion of a roof 24 (the inner mirror 20 is disposed at the front end portion of the roof 24 in the present exemplary embodiment).

(Vehicle Airbag Device 30)

As illustrated in FIG. 1 and FIG. 2, the vehicle airbag device 30 is configured including a module case 32 serving as a substantially rectangular box shaped "case" open toward the upper side, the airbag 34 that is stowed inside the module case 32 in a folded state, and an inflator 40 (gas generating device) that ejects gas and supplies the gas to the airbag 34. The vehicle airbag device 30 is disposed in (inside) the instrument panel 14 at the front side of the front passenger seat 10, and a vehicle width direction center line CL (see FIG. 2) of the vehicle airbag device 30 (module case 32) is set in a position that is substantially aligned with a seat width direction center line (not illustrated in the drawings) of the front passenger seat 10. The vehicle airbag device 30 is supported by instrument panel reinforcement (not illustrated in the drawings) or the like extending along the vehicle width direction in the instrument panel 14. An airbag door is formed to the instrument panel 14 at a location that covers the module case 32.

(Airbag 34)

As an example, the airbag 34 is configured in a bag shape by stitching together outer peripheral portions of plural base cloths. In the inflated and deployed state of the airbag 34, the airbag 34 includes a front passenger seat airbag 36 serving as a "first bag" that is inflated and deployed at the front side of the front passenger seat passenger P, and a center airbag 38 serving as a "second bag" that is inflated and deployed at the vehicle width direction center side of the front passenger seat airbag 36.

On being supplied with gas from the inflator 40, described later, the front passenger seat airbag 36 is inflated and deployed from the instrument panel 14 toward the rear side, and is disposed at the front side of the front passenger seat passenger P. Specifically, a width direction center line of the front passenger seat airbag 36 is configured so as to be substantially aligned with the vehicle width direction center line CL of the vehicle airbag device 30 (see FIG. 2). A width direction center portion of the front passenger seat airbag 36 is positioned at the front side of the head of the front passenger seat passenger P, and both width direction end portions of the front passenger seat airbag 36 are positioned at the front side of the shoulders of the front passenger seat passenger P. The head and upper body of the front passenger seat passenger P are thereby restrained from moving toward the front side by the front passenger seat airbag 36.

As illustrated in FIG. 1, a front end portion of the front passenger seat airbag 36 is configured so as to abut the instrument panel 14 and the windshield 22, and the front passenger seat airbag 36 is disposed so as to overlap (be superimposed on) the display 18 and the inner mirror 20 in side view. A rear portion and lower end portion of the front passenger seat airbag 36 bulges out toward the lower side at the rear side of the instrument panel 14. The front passenger seat airbag 36 is thereby supported from the front side by the instrument panel 14 and the windshield 22.

As illustrated in FIG. 2, the center airbag 38 is disposed adjacent to the vehicle width direction center side of the front passenger seat airbag 36, and is inflated and deployed at the vehicle width direction center side of the front passenger seat passenger P, at the upper side of the center console 12. As illustrated in FIG. 1, in the inflated and deployed state, the center airbag 38 is formed in a substantially elliptical shape in side view, and is disposed tilting toward the rear side on progression toward the upper side. Specifically, a rear end portion 38R of the center airbag 38 projects out toward the rear side with respect to the front passenger seat airbag 36, a portion of the center airbag 38 excluding the rear end portion 38R (this portion is hereafter referred to as a bag main body portion 38A) is disposed adjacent to the vehicle width direction center side of a rear portion of the front passenger seat airbag 36, and is disposed overlapping (superimposed on) the rear portion of the front passenger seat airbag 36 in side view.

In the inflated and deployed state of the center airbag 38, the bag main body portion 38A is formed with a substantially U-shaped cross-section open toward the vehicle width direction outer side (the front passenger seat airbag 36 side) viewed from the rear side, and an open portion (outer peripheral portion) of the bag main body portion 38A is joined by stitching or the like to a side wall at the vehicle width direction center side (the center airbag 38 side) of the front passenger seat airbag 36. The side wall at the vehicle width direction center side of the front passenger seat airbag 36 that overlaps the bag main body portion 38A in side view configures a partition wall 36A, and the interiors of the front passenger seat airbag 36 and the center airbag 38 are partitioned from each other by the partition wall 36A. Note that the interiors of the front passenger seat airbag 36 and the center airbag 38 are placed in communication by communication holes 36B, described later.

The rear end portion 38R of the center airbag 38, which projects out further toward the rear side than the front passenger seat airbag 36, is positioned obliquely at the front left side of the head of the front passenger seat passenger P (see FIG. 2), and an upper end of the rear end portion 38R abuts the roof 24 of the automobile V. The head of the front passenger seat passenger P is thereby restrained from moving obliquely forward toward the vehicle width direction center side by the rear end portion 38R. A lower side portion of the rear end portion 38R of the center airbag 38 configures a shoulder restraint portion 38R-1, and the shoulder restraint portion 38R-1 slopes toward the rear side on progression toward the upper side in side view. The left shoulder of the front passenger seat passenger P is restrained from moving obliquely toward the vehicle width direction center side and front side by the shoulder restraint portion 38R-1.

A front end portion 38F of the center airbag 38 is disposed adjacent to the rear side of the display 18, and is configured so as to abut a rear face of the display 18. A lower end portion 38L (a portion further to the lower side than a lower end of the display 18) of the center airbag 38 (bag main body portion 38A) bulges out so as to form a protrusion toward the lower side corresponding to a lower end portion of the front passenger seat airbag 36, and is disposed adjacent to the rear side of the instrument panel 14. The center airbag 38 is thereby supported from the front side by the display 18 and the instrument panel 14, and configuration is such that the center airbag 38 is not disposed in a region A1 facing the front side of the display 18.

The center airbag 38 includes a sloped face 38B that links the front end portion 38F to the upper end of the rear end portion 38R. The sloped face 38B slopes toward the rear side on progression from the front end portion 38F toward the upper side, and curves so as to protrude obliquely toward the upper front side. The sloped face 38B is disposed separated from the roof 24 and the windshield 22 toward the vehicle cabin inside, and the inner mirror 20 is disposed in a space between the sloped face 38B and the roof 24. In other words, the center airbag 38 is disposed obliquely at the lower rear side of the inner mirror 20 in side view, and the sloped face 38B is set such that the center airbag 38 and the inner mirror 20 do not overlap (are not superimposed on) each other. An upper end portion 38U (a portion further to the upper side than a lower end of the inner mirror 20) of the center airbag 38 is thereby disposed at the rear side of the inner mirror 20, and configuration is such that the center airbag 38 is not disposed in a region A2 that faces the front side of the inner mirror 20.

The communication holes 36B, serving as a pair of upper and lower "flow paths", are formed piercing through the partition wall 36A of the front passenger seat airbag 36, previously described, in the vehicle width direction. The communication holes 36B are each formed with a substantially circular shaped cross-section, and opening areas of the pair of communication holes 36B are the same area. The pair of communication holes 36B are disposed in a row in the up-down direction, and disposed at the rear side of the inner mirror 20. The center airbag 38 is accordingly supplied with gas from the front passenger seat airbag 36 through the communication holes 36B, and is inflated and deployed toward the vehicle width direction center side of the front passenger seat airbag 36. Namely, the center airbag 38 is inflated and deployed later than inflation and deployment of the front passenger seat airbag 36. More specifically, the communication holes 36B of the front passenger seat airbag 36 are opened, and after inflation and deployment of the front passenger seat airbag 36 (after inflation and deployment is complete, or inflation and deployment is close to completion, in the front passenger seat airbag 36), the center airbag 38 is inflated and deployed toward the vehicle width direction center side due to the center airbag 38 being supplied with gas through the communication holes 36B. Configuration is thereby such that the center airbag 38 is inflated and deployed later than the front passenger seat airbag 36, and is inflated and deployed toward a different direction (the vehicle width direction center side) than the inflation and deployment direction of the front passenger seat airbag 36.

Simple explanation follows regarding a folding method of the airbag 34. When folding the airbag 34, in the airbag 34 that has been opened out into a planar shape, the center airbag 38 is folded toward the front passenger seat airbag 36 side. Next, the center airbag 38 and the front passenger seat airbag 36 are folded in the front-rear direction by pleating, rolling, or by a combination of pleating and rolling. The folded airbag 34 is then stowed inside the module case 32.

(Inflator 40)

As illustrated in FIG. 2, the inflator 40 is embedded in a front end portion of the airbag 34 (specifically, the front passenger seat airbag 36), and is disposed on the vehicle width direction center line CL of the vehicle airbag device 30 in plan view. The inflator 40 is made of metal, formed in a hollow, substantially circular column shape, and is disposed with its axial direction substantially along the up-down direction. An attachment flange, not illustrated in the drawings, is provided to an up-down direction intermediate portion of an outer peripheral portion of the inflator 40. As illustrated in FIG. 1, the inflator 40 is inserted into an attachment hole (not illustrated in the drawings) formed in a bottom wall 32A of the module case 32, and the attachment flange is fixed to the bottom wall 32A by a fastening member such as a bolt (not illustrated in the drawings). An upper portion of the inflator 40 thereby projects out toward the upper side of the bottom wall 32A of the module case 32, and a lower portion of the inflator 40 projects out toward the lower side of the module case 32.

As illustrated in FIG. 2, the inflator 40 is electrically connected to an airbag ECU 42 (a controller). On actuation of the inflator 40 by the airbag ECU 42, gas ejected from the upper portion of the inflator 40 is supplied to the airbag 34 (front passenger seat airbag 36), and the airbag 34 is inflated and deployed. The airbag 34 causes the airbag door (instrument panel 14) to split open accompanying inflation and deployment of the airbag 34, and the airbag 34 is inflated and deployed to the outer side (surface side) of the instrument panel 14. Explanation follows regarding the airbag ECU 42.

The airbag ECU 42 is electrically connected to a collision sensor (or a set of sensors) 44, and is electrically connected to the inflator 40 previously described. Based on data from the collision sensor 44, the airbag ECU 42 is capable of detecting or predicting (the occurrence or inevitability of) various frontal collisions to the automobile V to which it is applied, without distinguishing between the various frontal collisions (or respective collision modes). The airbag ECU 42 actuates the inflator 40 at the same time as a frontal collision has been detected or predicted based on the data from the collision sensor 44. Note that frontal collision modes in which the airbag ECU 42 actuates the inflator 40 include frontal collisions at positions offset to one side in the vehicle width direction, such as oblique collisions and small overlap collisions.

Note that an oblique collision (oblique MDB collision, oblique collision) takes place, for example, in an oblique front direction as defined by NHSTA (for example, a collision at a relative angle of 15° with respect to a collision counterpart, with a vehicle width direction overlap amount of approximately 35%). In the present exemplary embodiment, as an example, an oblique collision at a relative speed of 90 km/hr is envisaged. A small overlap collision is a frontal collision of the automobile V in which, for example, the vehicle width direction overlap amount with the collision counterpart is 25% or less, as defined by IIHS. For example, a collision at the vehicle width direction outer side of a front side member, this being a vehicle body frame, corresponds to a small overlap collision. In the present exemplary embodiment, as an example, a small overlap collision at a relative speed of 64 km/hr is envisaged.

Explanation follows regarding operation and advantageous effects of the present exemplary embodiment.

In the vehicle airbag device 30 configured as described above, on detecting or predicting a frontal collision with the automobile V based a signal from the collision sensor 44, the airbag ECU 42 actuates the inflator 40. The airbag 34 (front passenger seat airbag 36) that has been supplied with gas from the inflator 40 is thereby inflated and deployed, while splitting open the airbag door set in the instrument panel 14. The front passenger seat airbag 36 is then inflated and deployed at the front side of the front passenger seat passenger P, and the center airbag 38 is inflated and deployed at the vehicle width direction center side of the front passenger seat airbag 36.

(Head-On Collision of Automobile V)

In cases in which the frontal collision of the automobile V is a head-on collision, the front passenger seat passenger P moves forward due to force due to inertia (see the arrow A in FIG. 2). Note that, since a three-point seatbelt is fitted to the front passenger seat passenger P, the forward movement of the front passenger seat passenger P is a mode in which the upper body of the front passenger seat passenger P tilts forward about the lumbar region. The head of the front passenger seat passenger P who is moving forward impacts the vehicle width direction center portion of the front passenger seat airbag 36, and the upper body of the front passenger seat passenger P impacts the front passenger seat airbag 36. When this occurs, a reaction force acts on the front passenger seat airbag 36 from the instrument panel 14 and the windshield 22, such that the head and the upper body of the front passenger seat passenger P are supported by the front passenger seat airbag 36, and the head and the upper body of the front passenger seat passenger P are restricted from moving. This accordingly enables the head and the upper body of the front passenger seat passenger P to be restrained from moving forward by the front passenger seat airbag 36 in head-on collisions of the automobile V.

(Oblique Collision or Small Overlap Collision of the Automobile V toward the Left Side)

In cases in which the frontal collision of the automobile V is an oblique collision or a small overlap collision toward the left side (driving seat side), as illustrated by the arrow B in FIG. 2, the front passenger seat passenger P moves toward the left side, this being the collision side in the vehicle width direction, with respect to the vehicle body, while moving forward due to force due to inertia. Namely, the front passenger seat passenger P moves obliquely forward toward the left (obliquely forward toward the vehicle width direction center side). Note that, since a three-point seatbelt is fitted to the front passenger seat passenger P, similarly to as described above, the forward movement of the front passenger seat passenger P is a mode in which the upper body of the front passenger seat passenger P tilts forward about the lumbar region.

The head of the front passenger seat passenger P who is moving obliquely forward toward the left impacts the rear end portion 38R of the center airbag 38, and the upper body of the front passenger seat passenger P impacts the front passenger seat airbag 36. The head and the upper body of the front passenger seat passenger P are thereby supported by the front passenger seat airbag 36 and the center airbag 38, and the front passenger seat passenger P is restricted from moving. This accordingly enables the front passenger seat passenger P to be restrained from moving obliquely forward toward the left by the front passenger seat airbag 36 and the center airbag 38 in oblique collisions and small overlap collisions.

Explanation follows regarding inflation and deployment of the airbag 34 when the inflator 40 has been actuated. When the inflator 40 is actuated, gas is supplied from the inflator 40 to the front passenger seat airbag 36, and the front passenger seat airbag 36 that was folded in the front-rear direction deploys toward the rear side, and is inflated and deployed from the instrument panel 14 toward the rear side.

Figure 3A:
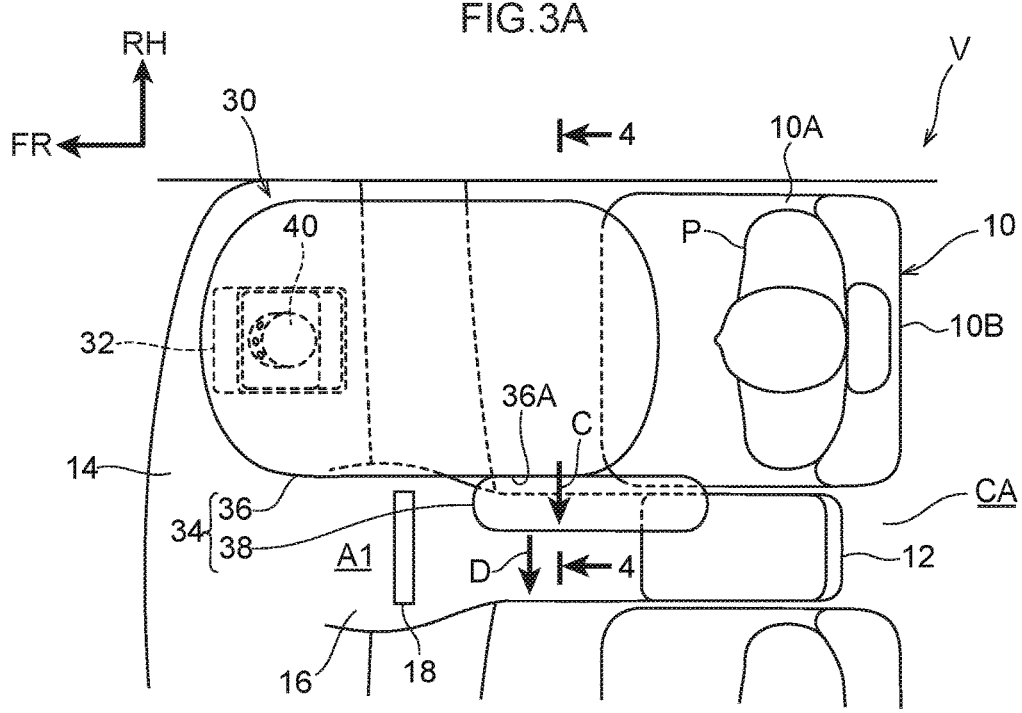
FIG. 3A is a plan view illustrating an initial stage of inflation and deployment of the center airbag illustrated in FIG. 2.
Figure 3B:
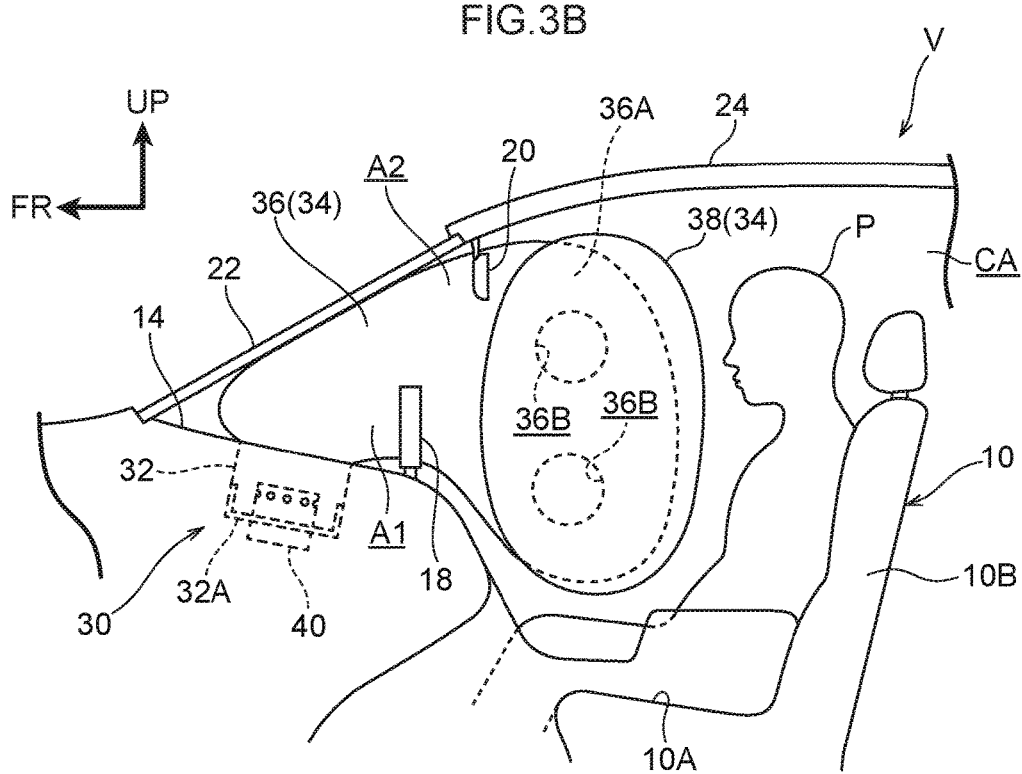
FIG. 3B is a side view illustrating an initial stage of inflation and deployment of the center airbag illustrated in FIG. 3A.
Figure 4:
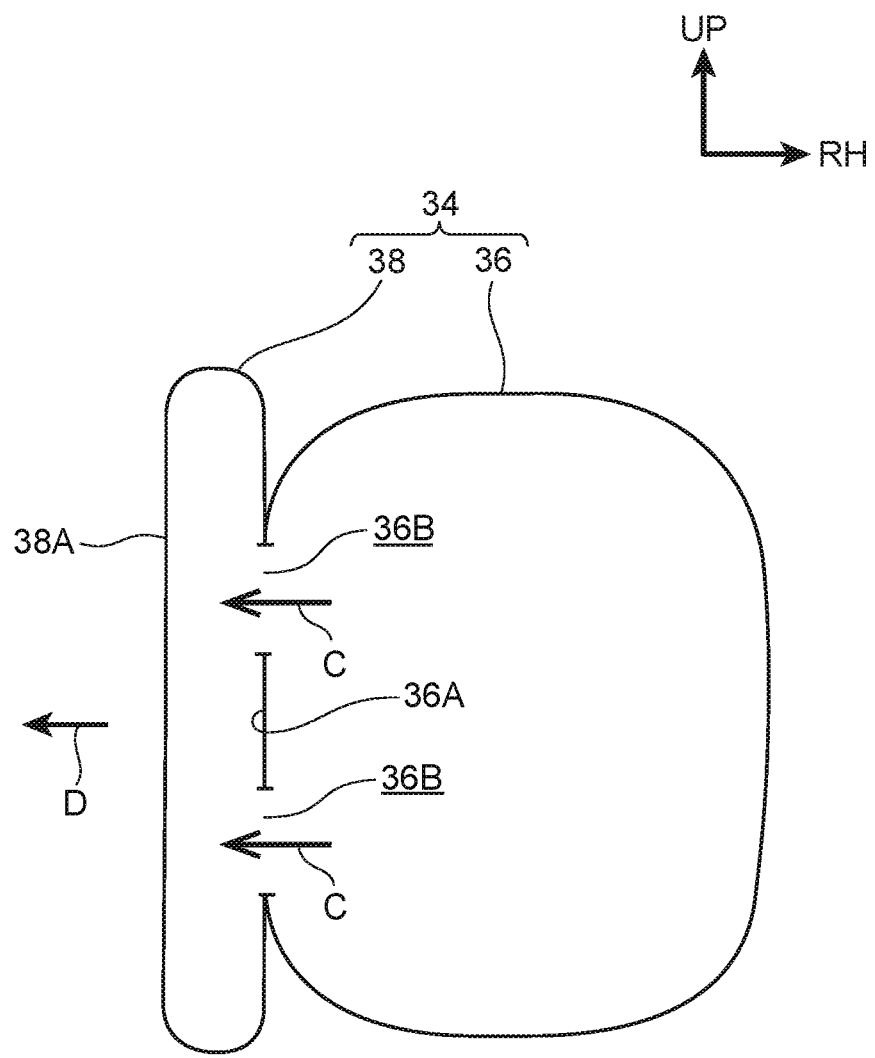
FIG. 4 is a cross-section (an enlarged cross-section along line 4-4 in FIG. 3A) viewed from the vehicle rear side, illustrating an initial stage of inflation and deployment of the center airbag illustrated in FIG. 3A.

As illustrated in FIG. 3A, FIG. 3B, and FIG. 4, when the front passenger seat airbag 36 is inflated and deployed, the communication holes 36B of the front passenger seat airbag 36 open at the rear side of the inner mirror 20 and the display 18. Gas supplied into the front passenger seat airbag 36 from the inflator 40 is thereby supplied into the center airbag 38 through the communication holes 36B (see the arrows C in FIG. 3A and FIG. 4). Gas is thereby supplied into the center airbag 38 from the front passenger seat airbag 36 that has been inflated and deployed, and the center airbag 38 is inflated and deployed toward the vehicle width direction center side later than the front passenger seat airbag 36 (see the arrow D in FIG. 3A and FIG. 4). Specifically, the center airbag 38 is inflated and deployed obliquely at the lower rear side of the inner mirror 20, and is inflated and deployed at the rear side of the display 18 (see FIG. 3A and FIG. 3B).

Thus in the present exemplary embodiment, the center airbag 38 is inflated and deployed toward the vehicle width direction center side on being supplied with gas from the front passenger seat airbag 36 that has been inflated and deployed. The center airbag 38 is accordingly inflated and deployed later than the inflation and deployment of the front passenger seat airbag 36, and is inflated and deployed in a different direction from the inflation and deployment direction of the front passenger seat airbag 36. Namely, as described above, the center airbag 38 is inflated and deployed at the vehicle width direction center side of the front passenger seat airbag 36 that has been inflated and deployed toward the rear side from the instrument panel 14. Thus, during inflation and deployment of the center airbag 38, the center airbag 38 can be inflated and deployed at the rear side of both the display 18 and the inner mirror 20, without the center airbag 38 being inflated and deployed from the front side toward the rear side of the display 18 and the inner mirror 20. This enables the center airbag 38 to be suppressed from catching (impinging) on the display 18 and the inner mirror 20 during inflation and deployment of the center airbag 38. This enables the deployment performance of the airbag 34 including the center airbag 38 to be improved.

Explanation follows regarding this point, with reference to an airbag of a comparative example. In the airbag of the comparative example, a front end portion of a center airbag extends further toward the front side than in the present exemplary embodiment, such that the front end portion of the center airbag and a front end portion of a front passenger seat airbag are substantially aligned. Namely, configuration is such that the center airbag is disposed in the region A1 facing the front side of the display 18, and in the region A2 facing the front side of the inner mirror 20. The center airbag and the front passenger seat airbag are in communication with each other at the front end portions thereof, and gas is supplied to the center airbag from the inflator 40. Thus in the comparative example, the center airbag is inflated and deployed from the front side toward the rear side of the display 18 and the inner mirror 20 by actuation of the inflator 40, such that there is a possibility that the center airbag impinges on the display 18 and the inner mirror 20. In such cases, the deployment performance of the airbag is reduced.

In contrast thereto, in the vehicle airbag device 30 of the present exemplary embodiment, as described above, the center airbag 38 is inflated and deployed obliquely at the lower rear side of the inner mirror 20, and is inflated and deployed at the rear side of the display 18, in side view. The center airbag 38 is inflated and deployed toward the vehicle width direction center side on being supplied with gas from the front passenger seat airbag 36 that has been inflated and deployed. This enables the center airbag 38 to be inflated and deployed at the rear side of both the display 18 and the inner mirror 20, without being inflated and deployed from the front side toward the rear side of the display 18 and the inner mirror 20. This enables the center airbag 38 to be suppressed from catching (impinging) on the display 18 and the inner mirror 20 during inflation and deployment of the center airbag 38, thereby enabling the deployment performance of the airbag 34 including the center airbag 38 to be improved.

The communication holes 36B are formed to the partition wall 36A of the front passenger seat airbag 36 that partitions between the interiors of the front passenger seat airbag 36 and the center airbag 38, and the interiors of the front passenger seat airbag 36 and the center airbag 38 are placed in communication with each other by the communication holes 36B. Thus the communication holes 36B formed to the partition wall 36A are opened by inflation and deployment of the front passenger seat airbag 36, and gas is supplied into the center airbag 38 through the communication holes 36B.

This enables inflation and deployment of the center airbag 38 to be started after inflation and deployment of the front passenger seat airbag 36, using a simple configuration.

By setting the opening area of the communication holes 36B (the total opening area of the pair of communication holes 36B) as appropriate, for example, the inflation and deployment timing of the center airbag 38 with respect to the front passenger seat airbag 36 can be adjusted to a suitable timing.

The pair of communication holes 36B are disposed further to the vehicle rear side than the inner mirror 20. Namely, the communication holes 36B, these being gas supply portions to the center airbag 38, are disposed at the rear side of the display 18 and the inner mirror 20. This enables inflation and deployment of the center airbag 38 to be started at the rear side of the display 18 and the inner mirror 20. This enables the center airbag 38 to be effectively suppressed from catching (impinging) on the display 18 and the inner mirror 20 during inflation and deployment of the center airbag 38.

In the folded-state airbag 34 stowed in the module case 32, after the center airbag 38 has been folded toward the front passenger seat airbag 36 side, the front passenger seat airbag 36 and the center airbag 38 are folded in the front-rear direction. Thus, when the airbag 34 is inflated and deployed, the airbag 34 is inflated and deployed in reverse sequence to the folding sequence of the airbag 34, such that the center airbag 38 is inflated and deployed after inflation and deployment of the front passenger seat airbag 36. Thus the folding method of the airbag 34 also enables the inflation and deployment timing of the center airbag 38 to be made later than the inflation and deployment timing of the front passenger seat airbag 36.

In side view, the center airbag 38 includes the sloped face 38B that links together the front end portion 38F and the rear end portion 38R, and the sloped face 38B slopes toward the rear side on progression from the front end portion 38F toward the upper side. This enables an increase in the capacity of the center airbag 38 to be suppressed.

Note that in the present exemplary embodiment, the pair of communication holes 36B are formed to the partition wall 36A; however, the number of communication holes 36B may be set as desired. Namely, communication holes 36B may be formed to the partition wall 36A at one location, or may be formed at three locations or more.

In the present exemplary embodiment, the opening areas of the pair of communication holes 36B disposed in a row at the top and bottom are the same area; however, the opening areas of the communication holes 36B may be different areas, corresponding to the inflation and deployment balance of the center airbag 38. For example, in cases in which the communication hole 36B disposed at the upper side is opened earlier than the communication hole 36B disposed at the lower side due to the folding method of the airbag 34, the opening area of the communication hole 36B disposed at the lower side may be set larger than the opening area of the communication hole 36B disposed at the upper side. The capacity of gas supplied to the center airbag 38 through the communication hole 36B disposed at the lower side is thereby increased, thereby enabling inflation and deployment of the center airbag 38 to be well balanced. In the center airbag 38, the rear end portion 38R projects out further toward the rear side than the front passenger seat airbag 36, such that, in cases in which completion of inflation and deployment of the rear end portion 38R is later than completion of inflation and deployment of the lower end portion 38L, the opening area of the communication hole 36B disposed at the upper side may be set larger than the opening area of the communication hole 36B disposed at the lower side. The capacity of gas supplied to the center airbag 38 through the communication hole 36B disposed at the upper side is thereby increased, thereby enabling inflation and deployment of the center airbag 38 to be well balanced.

In the present exemplary embodiment, the pair of communication holes 36B are disposed in a row in the up-down direction; however, the positions of the communication holes 36B may be set as desired corresponding to the shape of the center airbag 38, and the like. For example, the communication hole 36B disposed at the upper side may be disposed further toward the rear side than in the present exemplary embodiment, and the communication hole 36B disposed at the lower side may be disposed further toward the front side than in the present exemplary embodiment. Since the center airbag 38 tilts toward the rear side on progression toward the upper side in the present exemplary embodiment, this enables inflation and deployment of the center airbag 38 to be well balanced.

In the present exemplary embodiment, the front passenger seat airbag 36 and the center airbag 38 of the airbag 34 are formed in an integral bag shape. Instead of this, the front passenger seat airbag 36 and the center airbag 38 may be formed as separate, bag shaped bodies, and made into an integral unit by stitching both bodies together, or the like. In such cases, configuration is such that communication holes 36B are also formed to the center airbag 38, and these communication holes 36B are linked together with the communication holes 36B formed to the front passenger seat airbag 36.

In the present exemplary embodiment, an example has been explained in which the vehicle airbag device 30 has been applied to the automobile V with the display installed at the vehicle width direction center portion of the instrument panel 14; however, a vehicle cabin interior component installed at the vehicle width direction center portion of the instrument panel 14 is not limited thereto. For example, the vehicle cabin interior component may be a shift lever or the like installed at the vehicle width direction center portion of the instrument panel 14.

What is claimed is:

1. A vehicle airbag device comprising:
an airbag that is provided inside a front passenger seat side of an instrument panel and that is inflated and deployed toward an outer side of the front passenger seat side of the instrument panel on being supplied with gas from an inflator, the airbag including:
a first bag that is inflated and deployed from the instrument panel toward the front passenger seat side and that is disposed at a vehicle front side of a front passenger seat occupant; and
a second bag that is inflated and deployed at a vehicle width direction center side of the first bag, and that is disposed, in side view, at a vehicle rear side of a display device installed at a vehicle width direction center portion of the instrument panel and is disposed, in side view, obliquely at a vehicle lower side and rear side of an inner mirror installed at a vehicle width direction center portion of a roof or a windshield, a rear end portion of the second bag projecting out further toward the vehicle rear side than the first bag and disposed obliquely at a vehicle width direction center side and front side of a head of the front passenger seat occupant,
wherein the second bag is inflated and deployed from the first bag toward the vehicle width direction center side on being supplied with gas from the first bag that has been inflated and deployed, wherein the display device projects out toward a vehicle upper side from the instrument panel.

2. The vehicle airbag device of claim 1, wherein:

the first bag includes a partition wall that partitions between the first bag and the second bag;

the partition wall is formed with a flow path that places interiors of the first bag and the second bag in communication with each other in a vehicle width direction; and gas is supplied to the second bag through the flow path from the first bag that has been inflated and deployed.

3. The vehicle airbag device of claim 2, wherein in a state in which the airbag has been inflated and deployed, the flow path is disposed further toward the vehicle rear side than the inner mirror.

4. The vehicle airbag device of claim 2, wherein:

the partition wall is formed with a plurality of flow paths arranged along a vehicle up-down direction; and opening areas of the plurality of flow paths are different areas.

5. The vehicle airbag device of claim 2, wherein:

in a state in which the airbag has been inflated and deployed, the flow path is disposed at a rear side of the display device.

6. The vehicle airbag device of claim 1, wherein:

the airbag is stowed in a folded state in a case provided inside the instrument panel; and in the folded-state of the airbag, after the second bag has been folded toward a side of the first bag, the first bag and the second bag are folded in a vehicle front-rear direction.

7. The vehicle airbag device of claim 1, wherein:

in an inflated and deployed state of the second bag, a front end portion of the second bag is disposed adjacent to a rear side of the display device, and the front end portion of the second bag is configured so as to abut a rear face of the display device.

8. The vehicle airbag device of claim 1, wherein:

in an inflated and deployed state of the second bag, the second bad includes a sloped face that links a front end portion of the second bag to an upper end of the rear end portion of the second bag, the sloped face slopes toward a rear side on progression from the front end portion of the second bag, the sloped face is disposed separated from the roof and the windshield toward a vehicle cabin inside, and the inner mirror is disposed in a space between the sloped face and the roof.

9. The vehicle airbag device of claim 1, wherein:

in an inflated and deployed state of the second bag, a lower end portion of the second bag is configured to as to abut the instrument panel, and an upper end portion of the rear end portion of the second bag is configured so as to abut the roof in a vehicle cabin inside.

* * * * *